June 30, 1970   D. K. SLOSBERG ET AL   3,518,153
EMBOSSED FLOOR MATERIAL
Filed May 3, 1966
FIG. I
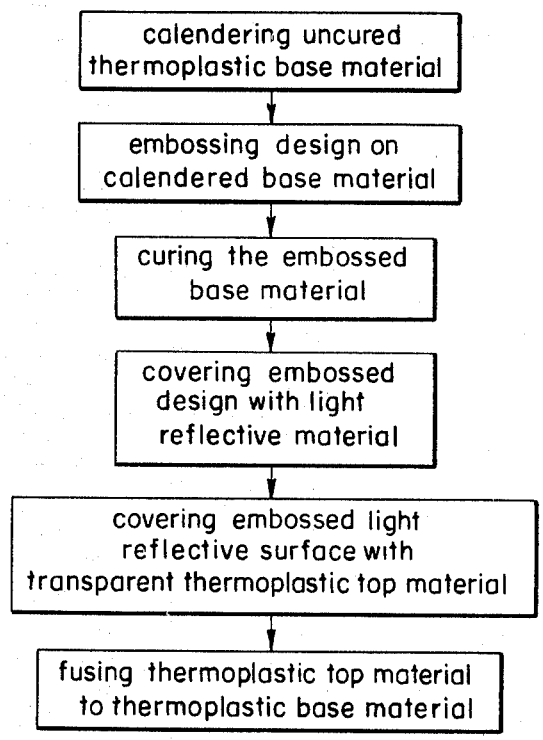
FIG. 2
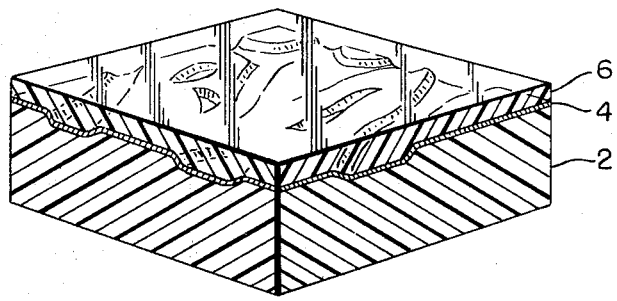
INVENTORS
DAVID K. SLOSBERG
MERRILL M. SMITH
EDWARD M. NAKONIECZNY
BY
Kenway, Jenney + Hildreth
ATTORNEYS 3,518,153
EMBOSSED FLOOR MATERIAL
David K. Slosberg, Yardley, Edward M. Nakonieczny, Philadelphia, and Merrill M. Smith, Morrisville, Pa., assignors to American Biltrite Rubber Co., Inc., Trenton, N.J., a corporation of Delaware
Filed May 3, 1966, Ser. No. 547,219
Int. Cl. B32b 7/10; B44f 1/04
U.S. Cl. 161—5    15 Claims

ABSTRACT OF THE DISCLOSURE

The invention is a composite flooring material having two layers of vinyl resins. The base layer has an embossed surface, and to this embossed surface is fusion bonded a top layer of vinyl resin, the upper surface of the latter being smooth. If desired, a reflective material may be incorporated between the two layers prior to bonding. The relationship between the viscosities of the two layers of vinyl resin is such that the upper layer may be fusion bonded to the lower layer without disrupting the embossed surface of the latter.

---

This invention concerns decorative flooring sheet material having an embossed appearance. In particular, it relates to embossed vinyl floor tile material characterized by an embossed appearance, and a method of fabricating such material.

In floor tile products, it is desirable to provide a tile or flooring material which has an embossed effect, while having a wear-resistant, smooth top surface. If the smooth top surface is not provided, then the indentations forming the embossed pattern will collect dirt, be difficult to polish, and be otherwise unsatisfactory. In providing such an embossed tile, deep embossing is often desirable, and for the purpose of pleasing appearance a high brilliance or light reflective property is also of advantage. In copending United States patent application Ser. No. 377,641, filed June 24, 1964, now abandoned, such a tile and a method of fabricating it are described, particularly in respect to a flooring material in which the base layer (which has the embossed face) is made of a thermosetting resin. Such thermosetting sheet materials may not always be desired by the customer, who may rather have a flooring or tile which is substantially of vinyl compound throughout. It is the general purpose of this invention to provide such a vinyl product, and a method of making it.

Therefore, one of the several objects of the invention is the provision of a sheet material having an embossed appearance but with a smooth, transparent, wear-resistant top surface.

Another object of the invention is to provide a material of the above class, and a method of preparation of the same, in which the embossed design is not degraded or distorted by subsequent hot pressing operations.

A further object of the invention is to provide a method of producing a floor material or tile of the above classes which is readily adaptable to vinyl compounds and is economic in use.

A still further object of the invention is to provide a flooring material which has, in addition to an embossed appearance, a metallized appearance of high brilliance.

Other objects and advantages will be in part obvious, and in part pointed out hereinafter.

The invention accordingly comprises the elements and combinations of elements, arrangement of parts, features of construction, and steps and sequence of steps and features of operation of the methods, all of which will be exemplified in the structures of the article and in the methods hereinafter described, and the scope of the application of which will be indicated in the appended claims.

In the accompanying drawings, which illustrate one embodiment of the invention and a method of manufacture thereof:

FIG. 1 is a schematic process flow diagram illustrating a method of preparing the flooring material of this invention; and FIG. 2 is a partially enlarged, cross-sectional view of a portion of a floor tile of this invention prepared by the process of this invention.

Referring to FIG. 2, a tile of this invention comprises a base layer 2 of a vinyl compound, an intermediate layer 4 of a light-reflective material, and a coating or topping layer 6 of vinyl compound. The top surface of the base layer 2 is provided with an embossed design, as will be described below, and on this may be deposited a metallic coating having a high reflecting quality, such as, for example, gold or silver material, using for application thereof such means as spray coating a fluid containing the metal, or by the deposition of metallic powders per se. The final coating layer 6 is a transparent vinyl compound and serves to protect the embossed surface of layer 2 while providing a smooth polished wear-resistant surface for the floor covering.

The base layer 2 may be a vinyl compound which has a viscosity of 700–1500 meter grams in the temperature range of 300–350° F., viscosity being measured by a Torque Rheometer such as a Brabender Plasti-Corder.

Two practical base formulations for the base layers are as follows:

TABLE 1

|  | Pounds |
|---|---|
| Polyvinyl chloride resin (specific viscosity—approximately 0.38 in a 0.4% nitrobenzene solution, at 25° C.) | 77.0 |
| High molecular weight linear chlorinated polyethylene, crystalline, 45% chlorine, glass transition temperature 35° to 50° C. | 18.0 |
| Clay—medium soft | 61.0 |
| Dry ground calcium carbonate | 20.0 |
| Barium and/or cadmium organic stabilizers | 3.0 |
| Titanium dioxide | 9.0 |
| Dioctyl phthalate | 5.1 |
| Epoxidized soya bean oil | 6.6 |
| Butyl, benzyl phthalate | 13.5 |
| Polyester, low viscosity plasticizer | 8.1 |

TABLE 2

|  | Pounds |
|---|---|
| Polyvinyl chloride resin (specific viscosity—approximately 0.30 in a 0.4% nitrobenzene solution) | 152.0 |
| Nitrile rubber (Mooney viscosity 45–50) | 22.5 |
| Clay—medium soft | 165.0 |
| Dry ground calcium carbonate | 100.0 |
| Barium and/or cadmium organic stabilizers | 9.0 |
| Paraffin | 1.75 |
| Dioctyl phthalate | 21.8 |
| Epoxidized soya bean oil | 11.4 |
| Butyl, benzyl phthalate | 10.4 |
| Rosin-derived alkyd resin | 11.4 |

The transparent top compound is an unfilled vinyl dry blend as to which the viscosity (as measured by said Torque Rheometer) is less than the viscosity of the base material by an amount falling within the range of 150–600 meter grams at the temperature of final pressing.

A practical clear top layer formulation is as follows:

TABLE 3

| | Pounds |
|---|---|
| Polyvinyl chloride resin (specific viscosity approximately 0.20 in a nitrobenzene solution at 25° C.) | 100.00 |
| Dioctyl phthalate | 23.00 |
| Epoxidized soya bean plasticizer | 6.00 |
| Barium and/or cadmium organic stabilizers | 3.00 |
| Stearic acid, triple pressed | .25 |

The following Table 4 will illustrate the said viscosity difference at a final pressing temperature of 320° F., using the topping of Table 3 on each of bases of Tables 1 and 2.

| | Viscosity of base at 320° F. (mg.) | Viscosity of topping at 320° F. (mg.) | Viscosity difference (mg.) | Result |
|---|---|---|---|---|
| Table 1 | 1,630 | 930 | 700 | Good. |
| Table 2 | 1,140 | 930 | 210 | Fair. |

(By "good" is meant that there was no discernible distortion in the pattern embossed on the base layer. By "fair" there was a slight distortion of fine detail, but not sufficient to make the product unacceptable to the trade. In Table 4, mg. refers to meter grams as measured on said Torque Rheometer).

The intermediate layer 4 is applied to the embossed surface of layer 2 as has been set forth above, preferably by a spraying process, using a metal powder in a carrier, the latter being compatible with the vinyl compound used for the base 2. A preferred carrier would be a solution of vinyl chloride acetate copolymer (12%–15% acetate content) in a ketone—such as methyl isobutyl ketone. Aromatic extender solvents, for example, toluol and the like, could be used. The resin solids in the solute at sprayable viscosity could be approximately 15%, and the metal powder content in the spray mixture should be sufficient to give a bright shiny surface on the embossed surface onto which the mixture is sprayed. Other normal effects are possible by the use of clear or light coatings or semi-opaque light-colored coatings or light pearlescence or irridescent finishes. The coating is to be selected so that it adheres to and is compatible with the embossed vinyl base 2 and the top transparent coating material 6. Other methods of application such as curtain coaters, rollers, etc. may be used, if desired.

If desired, the intermediate coating 4 may be omitted, particularly if coloring additives are added to the base 2. Illustrated in FIG. 1 is a schematic flow diagram showing the several steps of the method used to produce the vinyl product shown in FIG. 2. The base material 2 is first calendered, and preferably cut into tiles. The tile, which contains suitable curing agents and accelerators, is placed in a hydraulic press where the desired design is embossed on the sheet material, curing being preferably (although not necessarily) carried out at the same time by embossing at a temperature of approximately 360° F., and a pressure of approximately 1500 p.s.i. Cycling of the embossing operation could be approximately six minutes under heat and pressure, and four minutes cooling under pressure, these processing parameters being given for the exemplary formulation given above. It is within the skill of the art to select other suitable vinyl base 2 compositions, in view of the teachings herein in respect to viscosities at the operating temperatures.

Thereafter, the embossed base 2 is covered with the light reflective material 4, preferably by using spray coating, and the coating is dried. Having thus been coated, base 2 is then covered with the transparent thermoplastic topping material, as follows:

After embossing and coating as described above, the base component 2 with its reflective layer 4 is placed, with the embossed surface up, in a mold having side rails of the desired height. A transparent or translucent material, to form the topping layer 5, is then spread or otherwise distributed over the embossed surface to the desired depth, such a topping material having the requisite lesser viscosity set forth above and being, for example, the formulation also set forth above in Table 3. (The resin employed for the topping material obviously should also have the property of being transparent as an end characteristic, and not necessarily be transparent during the processing operation.) For example, a clear, plasticized, powder dry blend of the formulation given above for the topping layer 6 which has the proper viscosity as set forth above, may be spread over the surface 4 from a hopper having a distribution mechanism at the mouth thereof for evenly spreading the material over the embossed tile. The filled mold may then be hot pressed to fuse the thermoplastic topping resin 6 and to adhere it to the reflective surface 4, the processing being carried out, for example, at 320° F. at a pressure of approximately 500 p.s.i. for approximately six minutes under heat and pressure, followed by approximately four minutes cooling under pressure. With the viscosity difference as indicated above, it will be found that the embossing of the base material has not been distorted nor the embossed design effect lost (except as noted above in reference to Table 4) by the application of the topping material.

The above formulation (Table 3) for the topping layer may be mixed in a ribbon blender and heated to about 200° F. to permit the plasticizers to soak into the resin powder and then the formulation is cooled to 80° to 100° F., resulting in a dry, fluffy, white powder ready to be added to the hopper and used as described.

Following the teachings of this invention, it is within the skill of the art to use suitable additives in the base material and the topping material to facilitate processing, such as fillers, anti-oxidants, pigments, lubricants, solvents, stabilizers, accelerators, activators, and combinations thereof, provided that the resulting materials for the base layer 2 and the topping layer 6 are maintained at the proper viscosities, as set forth above.

The viscosities are set forth herein in terms of values as measured on a torque rheometer, and specifically a Brabender Plasti-Corder. On this machine which is readily available on the market, viscosities set forth above were determined using a speed of 30 r.p.m. and a roller head Model PL-V3AA was used. Since there are several ways of measuring viscosity, such as different torque rheometers or physico-chemical means, and since the values formed for a given material will be different in absolute numbers depending on the method used, the values herein stated are those obtained on the specific rheometer cited. However, the correlation between the viscosity values as are obtained from the several methods is well known in the art, and therefore the viscosity values using such other measuring means are not set forth herein.

It is apparent from the examples given that many different layer components may be utilized in the manufacture of flooring material under the invention. It is therefore not practical to attempt a comprehensive catalog of useful vinyl components; also, to attempt to apprehend or describe the invention in its broader aspects in terms of a large list of specific formulations suitable for the practice of the invention would be misleading. The success of the invention lies in the relationship of the viscosities of the vinyl component layers, and their individual composition is important only in the sense that the individual properties of the elements of any mechanical assemblage are important to their proper combination and coaction. To formulate a set of specifications for a component in the light of the present disclosure, or to test for and select vinyl compositions on the basis of their viscosities, will call for chemical knowledge and skill of the plastics engineer, but the office of such an engineer will be like that of the mechanical engineer who prescribes, in the construction of a machine, the proper materials and the proper dimensions therefor. From his knowledge as a chemist of the materials available which have the proper viscosities he will know or deduce with confidence their applicability to the purposes of the invention, or otherwise, routine tests not of an inventive nature will provide reliable data. In analogy to the case of a machine wherein the use of certain materials of construction or dimensions of parts would lead to no practically useful result, various materials will be rejected as inapplicable; others, operative as such and illustrative of the theoretical basis of the invention, may not be practically useful because the other processing parameters or material costs would keep them from being advantageously used for commerce. It may safely be assumed that no one will wish to make a useless composition, or will be misled because it is possible to misapply the teachings of the present disclosure in order to make a useless product.

In view of the above it will be seen that the several objects of the inventoion are achieved and other advantageous results attained.

It is to be understood that the invention is not limited in its application to the details of construction, the arrangement of parts, and the method and steps thereof illustrated in the accompanying drawings or set forth in the accompanying description since the invention is capable of other embodiments and of being practiced or carried out in various ways. Also, it is to be understood that the phraseology or terminology employed herein is for the purpose of description and not of limitation.

As many changes could be made in the above constructions and method without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having thus described our invention, what we claim as new and desire to secure by Letters Patent of the United States is:

1. A floor covering product having a smooth top surface and comprising a flat base sheet of cured, flexible, resilient thermoplastic material having an embossed surface, and a wear-resistant, transparent thermoplastic coating material fusion-bonded to the embossed surface, the viscosity of the base sheet material being higher than that of the coating material by at least 150 meter grams at the fusing temperature of the latter.

2. The product of claim 1 including a layer of light reflective material between the base sheet and the coating material.

3. The product of claim 1 in which each of the base sheet and the coating material is a vinyl resin.

4. The product of claim 1 in which the base sheet is a vinyl copolymer and the coating material is a vinyl polymer.

5. The product of claim 1 in which the base sheet material has the following composition:

| Component— | Parts |
|---|---|
| Polyvinyl chloride resin (specific viscosity—approximately 0.38 in a 0.4% nitrobenzene solution at 25° C.) | 77.0 |
| High molecular weight linear chlorinated polyethylene, crystalline, 45% chlorine, glass transition temperature 35° to 50° C. | 18.0 |
| Clay—medium soft | 61.0 |
| Dry ground calcium carbonate | 20.0 |
| Barium and/or cadmium organic stabilizers | 3.0 |
| Titanium dioxide | 9.0 |
| Dioctyl phthalate | 5.1 |
| Epoxidized soya bean oil | 6.6 |
| Butyl, benzyl phthalate | 13.5 |
| Polyester, low viscosity plasticizer | 8.1 | and in which the coating material has the following composition:

| Component— | Parts |
|---|---|
| Polyvinyl chloride resin (specific viscosity—approximately 0.20 in a 0.4% nitrobenzene solution at 25° C.) | 100.00 |
| Dioctyl phthalate | 23.00 |
| Epoxidized soya bean plasticizer | 6.00 |
| Barium and/or cadmium organic stabilizers | 3.00 |
| Stearic acid, triple pressed | .25 |

6. The product of claim 1 in which the base sheet material has the following composition:

| Component— | Parts |
|---|---|
| Polyvinyl chloride resin (specific viscosity—approximately 0.30 in a 0.4% nitrobenzene solution) | 152.0 |
| Nitrile rubber (Mooney viscosity 45–50) | 22.5 |
| Clay—medium soft | 165.0 |
| Dry ground calcium carbonate | 100.0 |
| Barium and/or cadmium organic stabilizers | 9.0 |
| Paraffin | 1.75 |
| Dioctyl phthalate | 21.8 |
| Epoxidized soya bean oil | 11.4 |
| Butyl, benzyl phthalate | 10.4 |
| Rosin-derived alkyd resin | 11.4 | and in which the coating material has the following composition:

| Component— | Parts |
|---|---|
| Polyvinyl chloride resin (specific viscosity—approximately 0.20 in a 0.4% nitrobenzene solution at 25° C.) | 100.00 |
| Dioctyl phthalate | 23.00 |
| Epoxidized soya bean plasticizer | 6.00 |
| Barium and/or cadmium organic stabilizers | 3.00 |
| Stearic acid, triple pressed | .25 |

7. The product of claim 3 in which the base sheet is a vinyl resin having a viscosity lying in the range of 700–1500 meter grams within a temperature range of 320° F.–350° F.

8. The product of claim 3 in which the base sheet is a vinyl resin having a viscosity lying in the range of 700–1500 meter grams within a temperature range of 320° F.–350° F.; and the coating material is a vinyl resin whose viscosity is lower than the viscosity of the material of the base sheet by an amount no less than 600 meter grams within said temperature range.

9. A floor covering product having a smooth top surface and comprising a flat base sheet of cured, flexible, resilient thermoplastic material having an embossed surface, and a wear-resistant, transparent coating material fusion-bonded to the embossed surface at a predetermined temperature and pressure, the base sheet material having a higher softening temperature than that of the coating material, and the viscosity of the coating material being lower than that of the base material by an amount no less than 150 meter grams at said temperature.

10. The product of claim 9 in which each of the base sheet and the covering material is a vinyl resin.

11. The method of making a floor covering product having a smooth top surface and an embossed appearance comprising the steps of embossing a design on a base sheet of resilient thermoplastic material, curing the embossed base sheet and fusion-bonding by heat and pressure to the embossed surface of the base sheet a layer of transparent thermoplastic covering material at a temperature at which the viscosity of the covering material is lower than that of the base material by no less than 150 meter grams.

12. The method of claim 11 in which each of the sheet of material having the embossed design and the transparent layer is a vinyl resin.

13. The method of claim 11 in which the base sheet material has a viscosity lying in the range of 700–1500 meter grams within a temperature range of 320° F.–350° F.; and the covering material has a viscosity lower than that of the material of the base sheet by an amount no less than approximately 150 meter grams within said temperature range.

14. The method of claim 11 including the step of depositing on said embossed surface a layer of light-reflecting material prior to fusing thereto the coating material.

15. The method of claim 11 in which both the base sheet and covering material are vinyl resins.

References Cited

UNITED STATES PATENTS

| | | | |
|---|---|---|---|
| 2,844,489 | 7/1958 | Gemmer | 117—20 |
| 3,137,609 | 6/1964 | Blaska | 161—2 |
| 2,987,102 | 6/1961 | Heinrichs | 161—5 |
| 2,875,087 | 2/1959 | Crandon | 117—10 |
| 2,482,598 | 9/1949 | Roos | 161—4 X |
| 3,049,459 | 8/1962 | Smith et al. | 161—3 |

ROBERT F. BURNETT, Primary Examiner

M. A. LITMAN, Assistant Examiner

U.S. Cl. X.R.

156—306, 219; 161—6, 119, 166, 252

UNITED STATES PATENT OFFICE
CERTIFICATE OF CORRECTION

Patent No. 3,518,153                    Dated June 30, 1970

Inventor(s) David K. Slosberg et al.

It is certified that error appears in the above-identified patent and that said Letters Patent are hereby corrected as shown below:

In the heading to the printed specification, line 3, David K. Slosberg, Yardley, Edward M. Nakonieczny," should read -- David K. Slosberg, Atlanta, Ga., Edward M. Nakonieczny, --.

Signed and sealed this 10th day of November 1970.

(SEAL)
Attest:

EDWARD M. FLETCHER, JR.                 WILLIAM E. SCHUYLER, JR.
Attesting Officer                       Commissioner of Patents